April 5, 1966  F. T. VACCARO  3,244,185
MONEY-ACTUATED DEVICES
Filed Jan. 18, 1963  3 Sheets-Sheet 1

INVENTOR
FRANCIS T. VACCARO
BY  ATTORNEY.

April 5, 1966 F. T. VACCARO 3,244,185
MONEY-ACTUATED DEVICES
Filed Jan. 18, 1963 3 Sheets-Sheet 2

INVENTOR
FRANCIS T. VACCARO
BY Rey Eilers
ATTORNEY.

United States Patent Office 3,244,185
Patented Apr. 5, 1966

---

3,244,185
MONEY-ACTUATED DEVICES
Francis T. Vaccaro, Pagedale, Mo., assignor to National Rejectors, Inc., St. Louis, Mo., a corporation of Missouri
Filed Jan. 18, 1963, Ser. No. 252,412
12 Claims. (Cl. 133—5)

This invention relates to improvement in money-actuated devices. More particularly, this invention relates to improvements in cycle-controlling mechanisms for money-actuated devices.

It is, therefore, an object of the present invention to provide an improved cycle-controlling mechanism for a money-actuated device.

It is frequently desirable, in money-actuated devices, to provide motors that can cause those money-actuated devices to operate on a cyclic basis; and, in recognition of that fact, many money-actuated devices have been proposed which used motors to cause those devices to operate on a cyclic basis. Those motors are usually intended to drive the output shafts thereof through one revolution and then come to rest; and, during that one revolution, those motors cause those money-actuated devices to provide one cycle of operation. Ordinarily, it would be undesirable to have any of those motors drive its output shaft through a number of revolution without having that shaft come to rest between each revolution; and, in recognition of that fact, several electric circuits have been proposed which could force a motor to come to rest between each revolution of the output shaft thereof. While such electric circuits are usable, they usually require a number of electrical switches; and such switches are relatively expensive. Consequently, it would be desirable to provide a motor for money-actuated devices which would positively come to rest between successive revolutions of the output shaft thereof, but which would not require a special electric circuit to force it to do so. Two motors that positively come to rest between successive revolutions of the output shafts thereof, but which do not require special electric circuits to force them to do so, are shown and described in co-pending application Serial No. 118,056 for Money-Actuated Devices which was filed by Ray G. Ellis and James N. Sturdy on June 19, 1961.

Some money-actuated devices, which normally should be forced to come to rest between successive cycles of operation thereof, must occasionally be operated on a continuous basis without coming to rest between successive cycles of operation thereof. For example, while change-making devices should normally be forced to come to rest between successive cycles of operation thereof, those change-making devices should be operated on a continuous basis without coming to rest between successive cycles of operation thereof whenever the money storage reservoirs of those change-making devices are to be emptied. Specifically, whenever it is desirable to check the amounts of money in the money storage reservoirs of a change-making device, that change-making device should be operated on a continuous basis without coming to rest between successive cycles of operation thereof until those money storage reservoirs are completely empty. Yet, change-making devices should be made so they are normally forced to come to rest between successive cycles of operation thereof. The present invention provides a change-making device which is normally forced to come to rest between successive cycles of operation thereof but which can be operated on a continuous basis without coming to rest between successive cycles of operation thereof whenever it is desirable to check the amounts of money in the money storage reservoirs thereof. That change-making device uses one of the motors shown and described in said application, and thus will normally be forced to come to rest between successive cycles of operation thereof; but that change-making device is equipped with an actuator that can be moved into position to keep that motor from forcing that change-making device to come to rest between successive cycles of operation thereof. It is, therefore, an object of the present invention to provide a change-making device which has a motor that normally forces that change-making device to come to rest between successive cycles of operation thereof but which is equipped with an actuator that can be moved into position to keep that motor from forcing that change-making device to come to rest between successive cycles of operation thereof.

Whenever a change-making device is to be operated on a continuous basis without coming to rest between successive cycles of operation thereof, power must be supplied to the motor of that change-making device on a continuous basis. Yet, the change-making device of the present invention is made so power will not ordiarily be supplied to the motor thereof on a continuous basis. The present invention makes it possible for power to be supplied to the motor of the change-making device thereof on a continuous basis by having the said actuator of that change-making device hold a lever in position to close a motor-running switch. As a result, the actuator provided by the present invention performs a dual function. It is, therefore, an object of the present invention to provide a change-making device with an actuator that can be moved into position to keep the motor of that change-making device from forcing that change-making device to come to rest between successive cycles of operation thereof and that also can hold a lever in position to close a motor-running switch.

Other and further objects and advantages of the present invention should become apparent from an examination of the drawing and accompanying description.

In the drawing and accompanying description a preferred embodiment of the present invention is shown and described but it it to be understood that the drawing and accompanying description are for the purpose of illustration only and do not limit the invention and that the invention will be defined by the appended claims.

Referring to the drawing in detail, the numeral 146 denotes the base of a preferred form of change-making device that is made in accordance with the principles and teachings of the present invention. That base is preferably made as a die casting; and it has two verticallydirected sockets in it which accommodate the lower ends of coin storage tubes 138 and 140. The base 146 will fit neatly within the lower end of a frame, not shown, for a change-making device, such as the change-making device of co-pending application Serial No. 35,823 now U.S. Patent No. 3,215,151 for Coin Separators which was filed by Edward L. Heim and myself on June 13, 1960. For a detailed description of any components of the change-making device of this application which are not fully shown and described by the drawing and description hereof, reference is hereby made to the drawing and description of the said Heim et al. application. The numeral 152 denotes an upwardly-extending boss, on the base 146, which is located adjacent the socket for the lower end of the coin storage tube 138; and that boss facilitates ready insertion of the lower end of that coin storage tube into the socket therefor.

Figure 2:
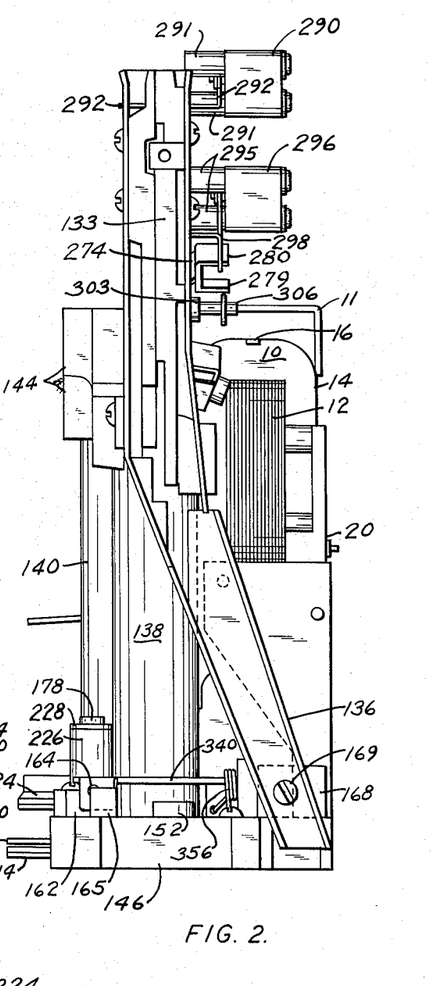
FIG. 2 is a broken-away, elevational view of the opposite end of the change-making device of FIG. 1.

The numeral 162 denotes an upwardly-extending boss, on the base 146, which is shown at the left-hand side of that base, as that base is viewed in FIG. 2. The boss 162 accommodates a horizontally-directed pivot 164; and an upwardly-extending boss 165 is provided on the base 146 adjacent one end of that pivot. The boss 165 acts as a stop for that end of that pivot. An upwardly extending boss 168 is provided on the base 146 adjacent the right-hand side of that base, as that base is viewed in FIG. 2. The boss 168 is adjacent the lower end of an accepted coin chute 136; and the boss 168 has an opening, not shown, which accommodates the threaded shank of a screw 169 which fixedly secures the lower end of that accepted coin chute to the boss 168, and thus to the base 146. A pivot 178 is fixedly secured to the base 146, adjacent the boss 162, and that pivot is shown in FIG. 2.

The numeral 188 generally denotes the coin-ejecting plate, and the numeral 214 generally denotes the bottom plate, for the change-making device of the present invention. That bottom plate underlies and helps support the coin-ejecting plate 188. Both the coin-ejecting plate 188 and the bottom plate 214 are disposed within a recess in the lower face of the base 146.

The numeral 224 denotes an elongated, generally L-shaped arm which has an elongated hub 226 at one end thereof; and that hub telescopes downwardly over the pivot 178. A C-washer 228 fits into a groove adjacent the top of that pivot to prevent accidental separation of the arm 224 from that pivot. A pin 230 is carried by the other end of the arm 224; and that pin projects upwardly and downwardly from the upper and lower faces, respectively, of that arm. The upwardly-projecting portion of the pin 230 rotatably supports a roller 232; and a C-washer 234 is seated in a groove adjacent the top of the upwardly-projecting portion of the pin 230 to prevent accidental separation of that roller from that pin. The downwardly-projecting portion of the pin 230 extends through an opening in the coin-ejecting plate 188 and lodges within a slot in the bottom plate 214.

A helical extension spring 236 has one end thereof secured to the arm 224 and has the other end thereof secured to a bracket 11 which is secured to and extends upwardly from the base 146. The spring 236 biases the arm 224 for rotation toward the bracket 11, but it can yield to permit rotation of that arm away from that bracket.

A motor 10 is secured to the bracket 11; and that motor is preferably a shaded pole motor. The motor 10 has a stator 12 which consists of a number of laminations that are suitably secured together to form the requisite magnetic path for the flux lines that are generated by a coil 14 which is mounted on that stator. That coil has terminals 16 extending therefrom, and those terminals will be suitably connected to a source of power.

A housing 18 is provided for the gear train which is associated with, and is a part of, the motor 10; and that gear train will provide a material reduction in speed between the input thereof and the output thereof. An extension 20 is provided at the rear of the gear housing 18, and that extension extends upwardly into position to overlie the lower part of the rear of the stator 12 of the motor 10. An extension 22 is provided at the front of the gear housing 18, and that extension extends upwardly into position to overlie the lower part of the front of the stator 12 of the motor 10. A bushing 24 is supported by the extension 20, and a similar bushing, not shown, is supported by the extension 22. Those bushings are in alinement and they support the shaft 26 of the motor 10 so that shaft can both reciprocate and rotate relative to those bushings. The shaft 26 has the rotor of the motor fixedly mounted on it, and that rotor will both rotate and reciprocate with that shaft.

A gear 30 loosely rotates on the shaft 26, and that gear is the input gear of the gear train within the gear housing 18. A helical spring, not shown, is telescoped over the shaft 26; and the opposite ends of that spring bear against the gear 30 and the rotor. That spring urges the shaft 26 and the rotor to the left in FIG. 1, but it can yield to permit that shaft and rotor to shift to the right. An abutment, not shown, on the front face of the rotor can engage an abutment, not shown, on the rear face of the gear 30 to interconnect that rotor and that gear for conjoint rotation, whenever the rotor and the shaft 26 move to their forward-most positions as the coil 14 is energized. However, whenever the coil 14 is not energized, the spring will urge the rotor and the shaft 26 rearwardly into positions where that rotor is free of the gear 30. The abutments on the rotor and gear 30 thus act as a clutch to cause rotation of the gears of the gear train only as long as the coil 14 of the motor 10 is energized.

The numeral 32 denotes a pivot which extends rearwardly from a boss 34 on the rear of the gear housing 18. If desired, that pivot can be a machine screw or it can be an integral part of the boss 34 and can be formed at the time the rear of the gear housing 18 is cast. A pin 36 extends rearwardly from a boss 38 on the rear of the gear housing 18; and that pin also can be a machine screw or can be made integral with the boss 38. A boss 40 is provided on the rear of the gear housing 18, and that boss has a reduced-diameter rear end.

The numeral 42 generally denotes the latch which is a part of the motor 10; and that latch is preferably made from a flat plate of magnetic material. That latch has a circular opening, not shown, through it, and that opening telescopes over the pivot 32. That opening will coact with that pivot to permit rotation of the latch 42 relative to the gear housing 18. A slot 46 is provided in the latch 42, and that slot telescopes over the pin 36 on the boss 38. That slot will coact with that pin to permit limited rotation of the latch 42 relative to the gear housing 18. An ear 48 is bent rearwardly from the plane of the latch 42, and an ear 50 is bent forwardly from the plane of that latch. The ears 48 and 50 are sturdy and rugged, and they are bent at ninety degrees to the plane of the latch 42. A headed pin 52 has the shank thereof telescoped through a roller 54 and then suitably secured to the latch 42; and that pin permits the roller 54 to rotate relative to the latch 42 while maintaining that roller in assembled relation with that latch. A portion 56 of the latch 42 is punched rearwardly from the plane of that latch to define a slot or opening.

The circular opening in the latch 42 is telescoped over the pivot 32, and thereafter a retainer 60 is pressed onto the pivot 32 to prevent accidental separation of that latch from that pivot while permitting rotation of that latch relative to that pivot. At the time that circular opening is telescoped over the pivot 32, the slot 46 is telescoped over the pin 36; and thereafter a retainer 62 is pressed onto that pin to help prevent accidental separation of the latch 42 from the gear housing 18. Once the circular opening and the slot 46 have, respectively, been telescoped over the pivot 32 and the pin 36, one end of a spring 58 will be hooked through the opening or slot formed by the punched-out portion 56 of the latch 42, and the other end of that spring will be hooked around the reduced diameter, rear portion of the boss 40. That spring will bias the latch 42 for rotation in the clockwise direction in FIG. 5, but that spring can yield to permit rotation of that latch in the counterclockwise direction.

The numeral 64 denotes the output shaft of the gear train within the gear housing 18; and that output shaft is, effectively, the output shaft of the motor 10. That output shaft extends rearwardly from a boss 65 on the rear of the gear housing 18, and that output shaft also extends forwardly from the front of that gear housing. The forwardly extending portion of the output shaft 64 extends through an opening in the bracket 11 to support a driving cam 244.

A washer 66 encircles the rear portion of the output shaft 64, and a cam 68 is fixedly secured to the rear end of that output shaft; and the washer 66 is interposed between the cam 68 and the boss 65. The cam 68 has an ear 70 projecting out from the generally circular periphery of that cam. The spacing between the ear 48 and the roller 54 on the latch 42 is such that the ear 70 can pass beneath and not engage the ear 48 but will engage the roller 54 whenever that latch is in the position shown by FIG. 5.

Figures 7, 9:
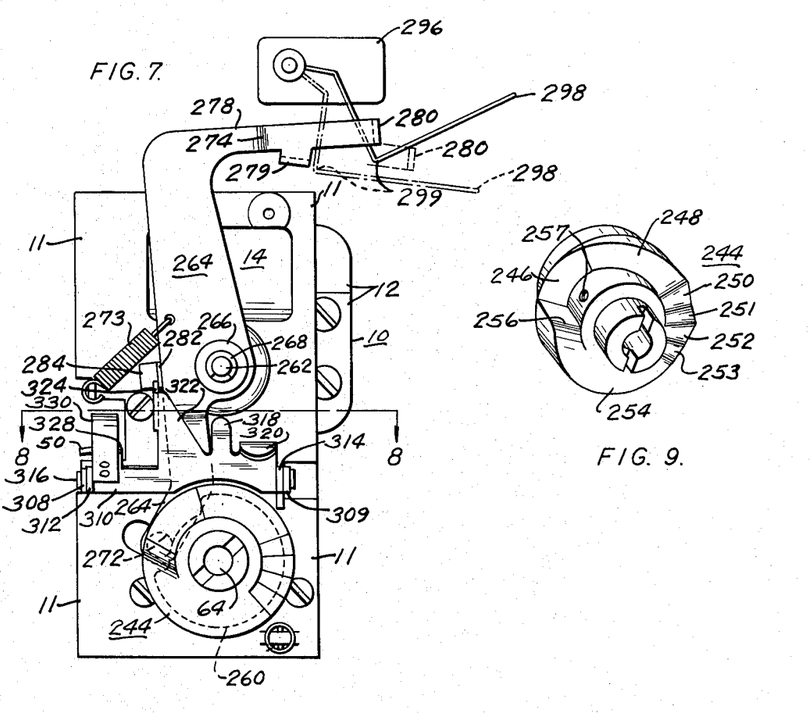
FIG. 7 is a view which is generally similar to that of FIG. 3, but wherein the lever is in its counter clockwise position.
FIG. 9 is a perspective view of the driving cam used in the change-making device of FIG. 1.

The driving cam 244 is shown in detail in FIG. 9; and that cam is circular in elevation. That cam has a low dwell 246, a long rise 248, a short dwell 250, a short rise 251, a second short dwell 252, a short rise 253, a high dwell 254, and an abrupt fall 256. The various dwells and rises of the cam 244 will engage the roller 232 on the arm 224 and will coact with the spring 236 to determine the position of that arm. The cam 244 has a threaded opening 257 that receives a set screw which can fixedly secure that cam to the output shaft 64. The cam 244 also has a camming surface 260 at the rear thereof.

Figure 1:
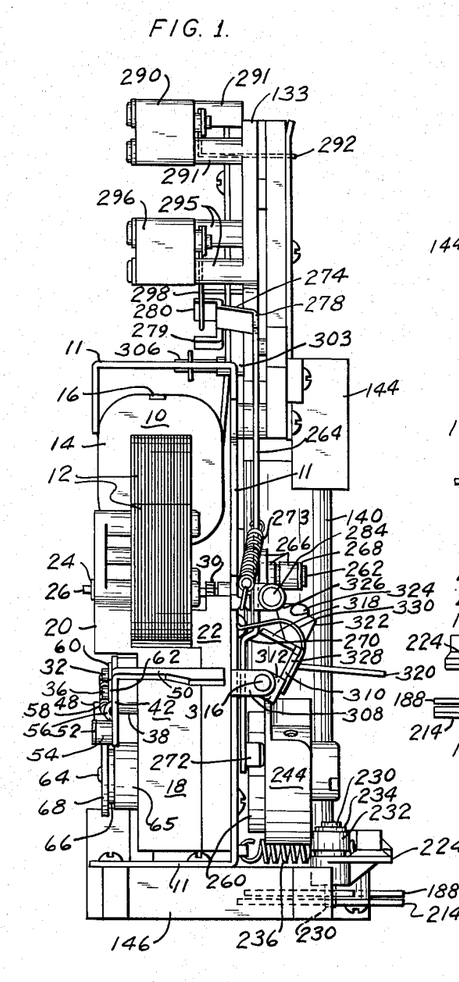
FIG. 1 is a broken-away, end elevational view of a preferred embodiment of change-making device that is made in accordance with the principles and teachings of the present invention.

The numeral 262 denotes a pivot that is secured to a forwardly-bent portion of the bracket 11; and that pivot is disposed so it is generally in vertical alinement with the output shaft 64 of the motor 10 but it is spaced above the level of that shaft. A lever is generally denoted by the numeral 264; and that lever has a hub 266 which telescopes over the pivot 262. A C-washer 268 seats within a groove adjacent the front of the pivot 262 to prevent accidental separation of the lever 264 from that pivot. The lever 264 has an offset 270 which disposes the lower portion of that lever rearwardly of the plane of the upper portion of that lever, as shown by FIG. 1. The rearwardly-offset lower portion of the lever 264 carries a pin that rotatably supports a roller 272; and that roller is in register with, and will be moved by, the camming surface 260 at the rear of the cam 244. A helical extension spring 273 has one end thereof hooked around an ear on the bracket 11, and has the other end thereof hooked in an opening in the lever 264. That spring will bias the lever 264 for counterclockwise rotation in FIGS. 3 and 7; and, as a result, that spring will hold the roller 272 in engagement with the camming surface 260 at the rear of the cam 244.

The lever 264 generally resembles an inverted "L"; and the arm of that lever is denoted by the numeral 278. An offset 274 is provided intermediate the ends of the arm 278; and that offset disposes the free end of that arm rearwardy of the plane of the upper portion of the lever 264. The arm 278 has horizontally-spaced, rearwardly-extending ears 279 and 280 thereon.

An ear 282 extends forwardly from the lever 264 at a point close to the level of the pivot 262. That ear carries a pivot which rotatably supports a roller 284; and the axis of that roller is perpendicular to the axis of the pivot 262.

The lever 264 provided by the present invention differs in form from the identically-numbered lever in the said Heim et al. application. However, in the sense that the lever 264 provided by the present invention is moved by the cam 244 to actuate switches, that lever is the same as the identically-numbered lever in the said Heim et al. application.

The numeral 290 denotes a double throw switch that is supported on bosses 291 which project rearwardly from a wall 133; and that wall coacts with other walls to define a plurality of coin passageways. In one preferred embodiment of the present invention, those various walls define a passageway for nickels, a passageway for dimes, and a passageway for quarters. The switch 290 has a switch arm 292 that has a forwardly-directed portion which extends through arcuate slots in those various walls to extend through the quarter passageway, through the dime passageway, and through the nickel passageway.

The numeral 295 denotes bosses which extends rearwardly from the wall 133; and those bosses support a double throw switch 296. That switch is disposed a short distance below the switch 290, and it has a switch arm 298 which has a sharp, re-entrant bend 299 therein. The free end of the switch arm 298 has a portion which is bent to extend forwardly through the quarter passageway. The re-entrant bend 299 normally underlies the ear 280, as indicated by FIG. 7.

A hollow cylinder 303 extends rearwardly from the rear face of the wall 133; and that cylinder holds a short, cylindrical, permanent magnet 306. That magnet underlies and is in register with the arm 298 of the switch 296; and the magnetic field of that magnet can hold the arm 298 in the lower position shown by dotted lines in FIG. 7 after a quarter has engaged that arm and has moved that arm downwardly.

The ear 279 on the arm 278 of lever 264 is adjacent the re-entrant bend 299 of the switch arm 298 whenever that ear is in the position shown by FIG. 7 and that switch arm is in the dotted-line position shown by FIG. 7. That ear can respond to clockwise rotation of the lever 264 in FIG. 7 to move to the left and engage the re-entrant bend 299, thereby forcing the actuator 298 to move upwardly and away from the magnet 306. Such movement will enable the returning spring within the switch 296 to move the actuator 298 upwardly until it engages and is held by the ear 280 on the lever 264.

The numerals 308 and 309 denote ears which are formed on, and which extend forwardly from, the bracket 1. Those ears are disposed intermediate the levels of pivot 262 and of the output shaft 64; and those ears are disposed on opposite sides of a vertical line connecting that pivot and that shaft. A lever 310 has two rearwardly-extending ears 312 and 314 thereon; and the outer faces of those ears abut the inner faces of the ears 308 and 309. Openings are provided in the ears 308, 309, 312 and 314; and those openings accommodate an elongated pivot 316.

Figure 8:
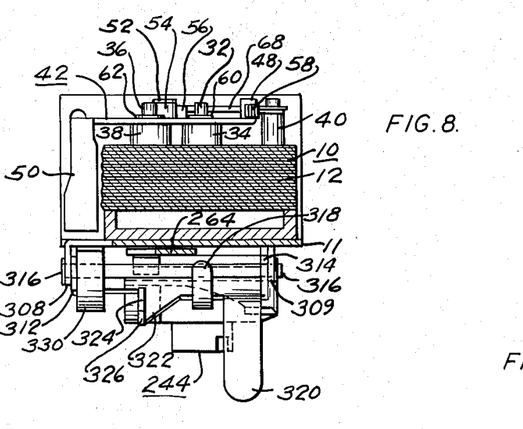
FIG. 8 is a sectional view through the motor and lever of FIG. 7, and it is taken along the plane indicated by the line 8—8 in FIG. 7.

An ear 318 extends rearwardly from the upper edge of the lever 310, and that ear lies in a plane which is generally perpendicular to the plane of that lever. That ear extends toward the bracket 11, and it will engage that bracket and serve as a stop whenever the lever 310 is in the moved position indicated by FIGS. 3 and 4. Normally, however, that ear is spaced from the bracket 11, as indicated by FIGS. 1 and 8. An ear 320 extends forwardly from the upper edge of the lever 310, and that ear inclines forwardly and upwardly from the plane of that lever. The ear 320 is wide and long, and it is intended to receive and to be actuated by the finger of the operator of the money-actuated device.

The lever 310 has an upwardly-extending projection 322 thereon intermediate the ears 312 and 318, and that projection has a rearwardly-extending ear 324 at the upper end thereof. The ear 324 lies in a plane which is generally perpendicular to the plane of the lever 310. A notch 326 is provided in the upper edge of the ear 324; and that notch is intended to accommodate part of the lower face of the roller 284 on the lever 264, whenever the lever 310 is in the moved position indicated by FIGS.

3 and 4. The lever 310 has a short, upwardly-extending projection 328 thereon intermediate the ear 312 and the projection 322; and that projection lies in the plane of that lever. A generally L-shaped spring 330 has one end thereof fixedly secured to the projection 328, as by rivets; and the other end of that spring extends rearwardly of the lever 310. As long as the lever 310 is in the normal position shown by FIGS. 1 and 8, that other end of the spring 330 will be disposed forwardly of the path of movement of the ear 50 on the latch 42. However, whenever the lever 310 is in the moved position indicated by FIGS. 3 and 4, that other end of the spring 330 will be above the level of the ear 50 and will be directly in the path of movement of that ear.

The numeral 340 denotes a generally J-shaped lever; and that lever is held by the pivot 164 which is shown in FIG. 2. The nature and operation of that lever are shown and described in detail in the said Heim et al. application. A spring 356 biases the lever 340 downwardly to its normal position, but that spring can yield to permit that lever to rise upwardly, as it will do during the paying out of change.

A funnel-like member 144 is mounted adjacent the upper ends of the coin reservoirs 138 and 140. That member supports the upper ends of those coin reservoirs and facilitates the manual insertion of nickels into the nickel reservoir 140 and facilitates the manual insertion of dimes into the dime reservoir 138.

A slug rejector will be used with the money-actuated device of the present invention; and that slug rejector will accommodate nickels, dimes and quarters. That slug rejector will have a "flipper" or other mechanism which will direct the first of a pair of authentic nickels to the nickel reservoir 140, and will direct the second of that pair of nickels toward the switch arm 292 of the switch 290. That slug rejector will direct each authentic dime toward the switch arm 292 of the switch 290, and then toward the dime reservoir 138. That slug rejector will also direct each authentic quarter toward the switch arm 292 of the switch 290; and thereafter that quarter will move toward the switch arm 298 of the switch 296. The slug rejector is a commercially available product which is marketed by National Rejectors Inc., of St. Louis, Missouri; and it is not a part of the present invention.

All of this means that whenever two authentic nickels are inserted, one will pass to the nickel reservoir 140 while the other will actuate the switch 290 and will then pass to the coin box of the money-actuated device. When a dime is inserted, it will actuate the switch 290 and will then pass to the dime reservoir 138. When a quarter is inserted, it will actuate the switch 290 and will then pass to the switch arm 298 of the switch 296 and actuate that switch. Thereafter, that quarter will pass to the coin box of the money-actuated device. The second nickel will actuate the switch 290 and thereby enable that switch to initiate the vending of the desired product or service, but will not actuate the switch 296. Similarly, the dime will actuate the switch 290 and thereby enable that switch to initiate the vending of the desired product or service, but will not actuate the switch 296. However, a quarter will not only actuate the switch 290, and thereby enable that switch to initiate the vending of the desired product or service, but will also actuate the switch 296.

When a quarter engages the switch arm 298, it will force that switch arm to move downwardly until the switch 296 completes an energizing circuit for the motor 10. When the switch arm 298 reaches the dotted-line position of FIG. 7, the flux lines from the permanent magnet 306 will apply a force to that switch arm which will tend to hold the switch 296 in motor-energizing position. As a result, even though the quarter will promptly move downwardly beyond the switch arm 298 and then pass to the coin box of the money-actuated device, the switch 296 will continue to energize the motor 10.

Figures 3, 4, 5, 6:
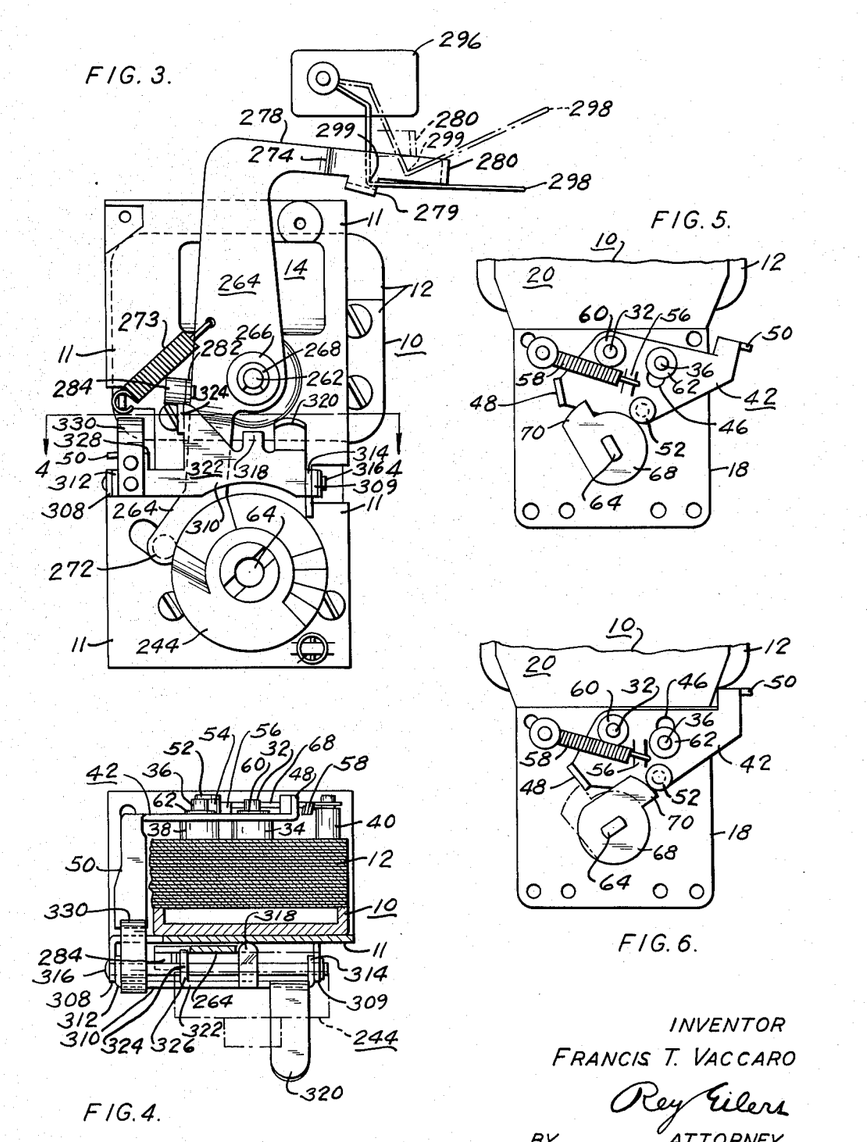
FIG. 3 is a front elevational view of the motor, lever and driving cam of the change-making device of FIG. 1.
FIG. 4 is a sectional plan view through the motor and lever of FIG. 5, and it is taken along the plane indicated by the line 4—4 of FIG. 3.
FIG. 5 is a rear elevational view of the motor and latch of the change-making device of FIG. 1.
FIG. 6 is a view which is generally similar to that of FIG. 5, but wherein the latch is shown in locking position.

The motor shaft 26 will shift to the right in FIG. 1 and will start rotating as the switch 296 closes; and the gear train within the housing 18 will start the output shaft 64 rotating in the clockwise direction in FIGS. 5 and 6 and in the counter clockwise direction in FIGS. 3 and 7. After that output shaft has rotated between forty-five and seventy degrees, the camming surface 260 at the rear of the cam 244 will engage the roller 272 on the lever 264 and will then start rotating that lever in the clockwise direction in FIG. 7. That rotation will shift the ear 279 on the arm 278 of that lever into engagement with the re-entrant bend in the switch arm 298, and will then force that switch arm to move upwardly and away from the permanent magnet 306. As the ear 279 was moved toward the re-entrant bend 299 of switch arm 298, the ear 280 on the arm 278 of lever 264 moved toward the position shown by FIG. 3. This means that at the time the ear 279 forces the switch arm 298 upwardly and away from the permanent magnet 306, the ear 280 will be out of register with the re-entrant bend 299 and will thus be in position to intercept that switch arm and thereby keep that switch arm from moving far enough upwardly to re-open the switch 296. In this way, the switch arm 298 will be moved far enough upwardly to free it from the permanent magnet 306 but will not be moved far enough upwardly to re-open the switch 298.

Continued rotation of the output shaft 64 will cause the ear 70 on the cam 68 to move beneath and to pass beyond the ear 48 on the latch 42. About the time the trailing edge of the ear 70 on cam 68 passes beyond the ear 48 on the latch 42, the high dwell 254 of cam 244 will move out of register with the roller 232 which is carried by the arm 224; and, thereupon, the spring 236 will pull the free end of that arm to the left in FIG. 1 until that roller engages the low dwell 246 of cam 244. The slide 188 will move with that arm; and it will move the lowermost nickel in the nickel reservoir 140 to the discharge opening, not shown, in the bottom plate 214, and will also move the lowermost dime in the dime reservoir 138 toward that discharge opening.

About the time the roller 232 moves into engagement with the low dwell 246 on cam 244, the ear 70 on the cam 68 will engage the roller 54 and will start rotating the latch 42 from the normal position of FIG. 5 to the moved position of FIG. 6. When the latch reaches the moved position of FIG. 6, the ear 50 on that latch will be immediately adjacent the stator 12 of the motor 10. Because that latch is made from magnetic material, and because the coil 14 will generate magnetic flux lines in the core 12, the ear 50 will be attracted to, and held in, the moved position of FIG. 6. In that position, the ear 48 on the latch 42 is directly in the path of the ear 70 on the cam 68.

While the ear 70 on the cam 68 is still adjacent the roller 54, the long rise 248 on the cam 244 will engage the roller 232, which is carried by the arm 224, and will cause the free end of that arm to start moving to the right in FIG. 1. The short dwell 250, the short rise 251, the short dwell 252, and the short rise 253 will successively engage the roller 232; and, by the time the rise 253 has passed beyond the roller 252, the free end of the arm 224 will have been moved back to the initial position shown by FIG. 1. As that free end moved back to that position, the side 188 moved with it; and as that slide moved from its initial position to its moved position and then back to its initial position, a nickel and a dime were paid out as change. In this way, the money-actuated device of the present invention can respond to the insertion of a quarter to effect vending of the desired product or service and can also pay out fifteen cents as change.

Shortly after the high dwell 254 on cam 244 again moves into register with the roller 232, the camming surface 260 at the rear of the cam 244 will free the roller 272 on the lever 264, and will thereby permit the spring 273 to return that lever to the initial position shown by FIG. 7. As that lever moves back to its initial position, the ear 280 will again move into register with the re-entrant bend 299 of switch arm 298; and, consequently, that switch arm will be able to move far enough upwardly to re-open the switch 296. Thereupon the motor 10 will become de-energized, the output shaft 64 will come to rest, and the spring 58 will return the latch 42 to the initial position shown by FIG. 5. At this time, the high dwell 254 will again be in register with the roller 232, the switch arm 298 will be in the solid-line position shown in FIG. 7, and the latch 42 will have the ear 48 thereof disposed out of the path of the ear 70 on the cam 68. As a result, the money-actuated device of the present invention will have completed one full cycle of operation and will be in position to begin a further cycle of operation.

In the unlikely event that the switch arm 298 failed to move back up to the normal position shown by solid lines in FIG. 7, or in the equally unlikely event that the motor-energizing contacts of the switch 296 welded themselves together, the motor 10 would not become de-energized as the spring 273 shifted the lever 264 from the moved position of FIG. 3 to the normal position of FIG. 7. Further, the continued energization of the motor 10 would cause the output shaft 64 to continue to rotate in the clockwise direction in FIGS. 5 and 6 and in the counter clockwise direction in FIGS. 3 and 7. Continued rotation of the output shaft 64 must be limited; because if it were not limited it would lead to the paying out of additional nickels and dimes. Continued rotation of the output shaft 64 is limited by the latch 42.

Specifically, the ear 50 on that latch will respond to continued energization of the motor 10 to hold that latch in the position shown by FIG. 6; and, consequently, the ear 48 on that latch will continue to remain directly in the path of the ear 70 on the cam 68. As a result, shortly after the cam 68 starts a second revolution, the ear 70 on that cam will engage the ear 48 on the latch 42 and be held against further rotation. Because the cam 68 will be held against further rotation, the output shaft 64 will be held against further rotation and will be unable to rotate the cam 244. The cam 68 will be intercepted and held by the ear 48 on the latch 42 before the high dwell 254 on the cam 244 is able to move out of register with the roller 232 on the arm 224. This means that the free end of the arm 224 will be unable to move to the left in FIG. 1, and will thus be unable to cause the slide 188 to move and pay out any nickels or dimes. In this way, the money-actuated device of the present invention keeps undesired continued energization of the motor 10 from causing the dispensing of unmerited change.

Once the ear 70 has engaged the ear 48, the gear train within the gear housing 18 will have enough inertia and friction and mechanical advantage to continue to hold the ear 70 of the cam 68 solidly in holding engagement with the ear 48 on the latch 42, even though someone applies heavy and sharp blows to the machine with which the change-making device of the present invention is used. Further, the inertia and friction and mechanical advantage of that gear train will hold the ear 70 of the cam 68 in engagement with the ear 48 on the latch 42, and thereby keep that latch from returning to its normal position, even if the fuse were to be removed and replaced or the plug, for the machine with which the change-making device is used, were to be removed from and then re-inserted in the electrical outlet. As a result, the motor 10 will be able to positively prevent the initiation and completion of the second cycle of operation of that change-making device until after a service man has located the source of trouble which prevented the de-energization of the coil 14 at the end of the first revolution of the output shaft 64.

It will be noted that the operation of the latch 42 is automatic and is wholly independent of any additional switches or circuitry. Further, it will be noted that the operation of that latch is direct and positive. Moreover, it will be noted that if the spring 58 were to break and thus become unable to move the latch 42 back to its normal position, the motor 10 would "fail safe" and thereby prevent continued rotation of the output shaft 64. The overall result is that the present invention provides, in a simple, direct and inexpensive manner, full, automatic and complete protection against undesired rotation of the output shaft of the motor of a change-making device through a second revolution without an intervening de-energization of that motor.

Whenever it is desirable to run the motor 10 continuously, as when the coin storage reservoirs 138 and 140 are to be emptied, the service man or owner of the machine in which the change-making device of the present invention is mounted will press upwardly on the ear 320 of the lever 310. Thereupon, that lever will shift from the normal position of FIG. 1 to the moved position of FIGS. 3 and 4; and, as that lever reaches that moved position, the ear 318 thereof will engage the forward face of the bracket 11 and thereby halt further rotation of that lever. Shortly before the lever 310 reaches its moved position, the inclined, rearwardly-extending face on the ear 324 will engage the roller 284 carried by the lever 264 and will cause that lever to rotate from the normal position of FIG. 7 to the moved position of FIG. 3. As that lever moves toward the moved position of FIG. 3, the ear 280 thereon will move out of register with the re-entrant bend 299 in the switch arm 298 of switch 296 and will move into engagement with the free end of that switch arm. In doing so, that ear will force that switch arm to move to the position shown by FIG. 3; and as that switch arm moves to that position it will close the switch 296 and energize the motor 10. As the lever 310 reaches the moved position of FIGS. 3 and 4, the notch 326 on the ear 324 will move into position under the roller 284; and that notch will coact with that roller and with the spring 273 to hold the lever 310 in its moved position. Specifically, the helical extension spring 273 biases the lever 264 for rotation in the counter clockwise direction in FIGS. 3 and 7, and thus normally biases the roller 284 downwardly. The bottom of the notch 326 is below the level of the high point on the ear 324, and that high point is disposed rearwardly of the roller 284 whenever the lever 310 is in the moved position of FIGS. 3 and 4. To return the lever 310 to its initial position, it is necessary to raise and then release the roller 284; and the spring 273 resists any raising of that roller. Consequently, until such time as the operator applies a positive downward force to the ear 320 of the lever 310, the spring 273 and the roller 284 and the notch 326 will coact to hold that lever in its moved position.

The closing of the switch 296 will cause the motor 10 to rotate its output shaft 64 in the counter clockwise direction in FIGS. 3 and 7 and in the clockwise direction in FIGS. 5 and 6. The cam 68 will respond to the clockwise rotation of that output shaft to cause the ear 70 thereon to pass beneath and then beyond the ear 48 on the latch 42, and will thereafter cause the ear 70 to engage the roller 54. That engagement will force the latch 42 to move to the position shown by FIG. 6; and, in that position, the ear 48 on that latch will lie directly in the path of the ear 70 on the cam 68. However, the ear 48 will not be permitted to remain in the path of the ear 70 on the cam 68.

Specifically, when the lever 310 was shifted into the moved position of FIGS. 3 and 4; the free end of the spring 330 on that lever moved into the path of the ear 50 on the latch 42. The positive force which the ear 70 on the cam 68 applies to the roller 54, carried by the latch 42, is so great that the spring 330 is unable to prevent movement of the ear 50 into the position shown by FIG. 6; and, as the ear 50 moves into that position, the spring 330 yields to accommodate that movement.

However, as soon as the ear 70 of the cam 68 moves beyond the roller 54, carried by the latch 42, the spring 330 will force the ear 50 on the latch 42 to move back down to the position shown by FIG. 5. The magnetic flux lines from the stator 12 will resist the downward movement of the ear 50 on the latch 42, but the spring 330 is quite strong and will overcome those magnetic flux lines and force the ear 50 down to the position shown by FIG. 5. The magnetic flux lines from the stator 12 will continue to attract the latch 42, but those magnetic flux lines will not be strong enough to raise that latch to the position shown by FIG. 6. Consequently, the latch 42 will remain in the position shown by FIG. 5 throughout the rest of the said revolution of the output shaft 64.

If the lever 310 is left in the moved position of FIGS. 3 and 4 to enable the motor 10 to provide further revolutions of the output shaft 64, the ear 70 will, during each of those revolutions, pass beneath and then beyond the ear 48 on the latch 42, will engage the roller 54 carried by that latch and force that latch to move to the position shown by FIG. 6, and will then move beyond that roller and thereby free the latch 42. At such time, the restorative forces within the spring 330 will force the latch 42 down to the position shown by FIG. 5. As a result, as long as the lever 310 is in the moved position of FIGS. 3 and 4, the cam 68 will recurrently force the latch 42 into the position where it could intercept the ear 70 of the cam during a subsequent revolution of the output shaft 64, but the spring 330 will subsequently move that latch out of the said position.

To return the lever 310 to its normal position, the service man or the owner of the vending machine, in which the change-making device of the present invention is mounted, need only press downwardly on the ear 320 of that lever. The resulting pressure will cause the projection 322 to move forwardly and away from the bracket 11; and the high point on the ear 324 of that projection will raise the roller 284 and then move out from beneath that roller. The raising of the roller 284 will cause a short, momentary, additional clockwise rotation of the lever 264, but that additional clockwise rotation is not objectionable. After the ear 324 has moved out from beneath the roller 284, the lever 264 will respond to the restorative force of the spring 273 to return to the normal position shown by FIG. 7. Thereupon, the switch arm 298 of the switch 296 will return to the solid-line position of FIG. 7 and de-energize the motor 10.

It will thus be apparent that the change-making device of the present invention will normally prevent successive cycles of operation thereof unless the motor 10 is permitted to be de-energized between successive cycles of operation. This is a very desirable result, because it prevents the dispensing of change when change should not be dispensed. Yet, whenever it is desirable to have the motor 10 run continuously, as when the coin storage reservoirs 138 and 140 are to be emptied, the lever 310 of that change-making device can be shifted to permit continuous running of the motor 10.

Whereas the drawing and accompanying description have shown and described a preferred embodiment of the present invention, it should be apparent to those skilled in the art that various changes may be made in the form of the invention without affecting the scope thereof.

What I claim is:

1. A change-making device that comprises:
(a) an electric motor that has an output shaft and a stator and a coil,
(b) a cam that is mounted on and rotatable with said shaft,
(c) an abutment on said cam,
(d) a latch of magnetic material that is rotatably mounted adjacent said cam,
(e) a roller on said latch that normally lies in the path of said abutment on said cam but that can be moved out of said path,
(f) an ear on said latch that normally is disposed out of said path of said abutment on said cam but that can be moved into said path,
(g) a second ear on said latch that normally is spaced away from said stator of said motor,
(h) said abutment on said cam responding to a first revolution of said output shaft to engage said roller on said latch and rotate said latch into latching position wherein the first said ear on said latch is in the path of said abutment on said cam and wherein said second ear on said latch is in engagement with said stator of said motor,
(i) said second ear on said latch thereafter responding to magnetic flux lines from said stator of said motor to tend to hold said latch in latching position,
(j) a second cam that is mounted on and rotatable with said shaft,
(k) a lever that is rotatably mounted adjacent said second cam,
(l) a motor-energizing switch that is adjacent said lever, and
(m) an actuator that is rotatably mounted adjacent said latch and adjacent said lever,
(n) said lever having a roller rotatably mounted thereon,
(o) said actuator having an ear thereon and a notch adjacent said ear,
(p) said actuator having a spring thereon,
(q) said actuator normally being in a position where said ear and said notch thereof are spaced away from said roller on said lever and said spring thereof is spaced away from the path of said second ear on said latch,
(r) said second cam responding to said first revolution of said shaft to move said lever into switch-actuating position wherein said lever can enable said switch to supply current to said coil of said motor and then, close to the end of said first revolution of said shaft, can permit said lever to move out of said switch-actuating position so said coil of said motor can become de-energized,
(s) said latch responding to said de-energization of said coil of said motor to return to its initial position and thereby move said first ear thereon out of the path of said abutment of the first said cam,
(t) whereby during a first revolution of said shaft wherein said coil of said motor is energized and is thereafter de-energized said latch will be moved into latching position and will be held in latching position by said magnetic flux lines from said motor and will thereafter be freed for movement back to its initial position,
(u) said latch responding, as long as said actuator is in said position, to continued and uninterrupted energization of said coil of said motor to remain in latching position, and said first ear on said latch thereafter intercepting and holding said abutment on the first said cam before said shaft can complete a second revolution,
(v) said actuator being movable into actuating position wherein said notch and said ear on said actuator co-act with said roller on said lever to hold said lever in said switch-actuating position and wherein said spring will be in the path of said second ear on said latch,
(w) said switch being adapted to respond to the holding of said lever in switch-actuating position to keep said coil of said motor energized for a plurality of revolutions of said shaft,
(x) the first said cam responding to the first of said plurality of revolutions of said shaft to cause the abutment thereon to engage said roller on said latch and move said latch into latching position, and said spring on said actuator yielding to permit said latch to move into latching position but thereafter moving said latch back out of latching position as said abutment on the first said cam moves beyond said roller on said latch,
(y) whereby, as long as said actuator is in actuating position, said coil of said motor will be kept energized continuously and said shaft will rotate continuously and said latch will move into and then out of latching position during each revolution of said shaft.

2. A cycle-controlling device that comprises:
(a) an electric motor that has an output shaft and a stator and a coil,
(b) a cam that is mounted on and rotatable with said shaft,
(c) a latch of magnetic material that is rotatably mounted adjacent said cam and that is normally spaced away from said stator,
(d) a roller on said latch that normally lies in the path of said cam but that can be moved out of said path,
(e) an ear on said latch that normally is disposed out of said path of said cam but that can be moved into said path,
(f) said cam responding to a first revolution of said output shaft to engage said roller on said latch and rotate said latch into latching position wherein said ear on said latch is in the path of said cam and wherein said latch is immediately adjacent said stator of said motor,
(g) said latch thereafter responding to magnetic flux lines from said stator of said motor to tend to remain in latching position,
(h) a second cam that is mounted on and rotatable with said shaft,
(i) a lever that is rotatably mounted adjacent said second cam,
(j) a motor-energizing switch that is adjacent said lever, and
(k) an actuator that is rotatably mounted adjacent said latch and adjacent said lever,
(l) said lever having a roller rotatably mounted therein,
(m) said actuator having a notch therein,
(n) said actuator having a spring thereon,
(o) said actuator normally being in a position where said notch thereof is spaced away from said roller on said lever and said spring thereof is spaced away from the path of said latch,
(p) said second cam responding to said first revolution of said shaft to move said lever into switch-actuating position wherein said lever can enable said switch to supply current to said coil of said motor and then, close to the end of said first revolution of said shaft, can permit said lever to move out of said switch-actuating position so said coil of said motor can become de-energized,
(q) said latch responding to said de-energization of said coil of said motor to return to its initial position and thereby move said ear thereon out of the path of the first said cam,
(r) whereby during a first revolution of said shaft wherein said coil of said motor is energized and is thereafter de-energized said latch will be moved into latching position and will be held in latching position by said magnetic flux lines from said motor and will thereafter be freed for movement back to its initial position,
(s) said latch responding, as long as said actuator is in said position, to continued and uninterrupted energization of said coil of said motor to remain in latching position, and said ear on said latch thereafter intercepting and holding the first said cam before said shaft can complete a second revolution,
(t) said actuator being movable into actuating position wherein said notch thereof coacts with said roller on said lever to hold said lever in said switch-actuating position and wherein said spring will be in the path of said latch,
(u) said switch being adapted to respond to the holding of said lever in switch-actuating position to keep said coil of said motor energized for a plurality of revolutions of said shaft,
(v) the first said cam responding to the first of said plurality of revolutions of said shaft to engage said roller on said latch and move said latch into latching position, and said spring on said actuator yielding to permit said latch to move into latching position but thereafter moving said latch back out of latching position as the first said cam moves beyond said roller on said latch,
(w) whereby, as long as said actuator is in actuating position, said coil of said motor will be kept energized continuously and said shaft will rotate continuously and said latch will move into and then out of latching position during each revolution of said shaft.

3. A cycle-controlling device that comprises:
(a) an electric motor that has an output shaft and a stator and a coil,
(b) a cam that is mounted on and rotatable with said shaft,
(c) a latch of magnetic material that is movably mounted adjacent said cam and that is normally spaced away from said stator,
(d) a member on said latch that normally lies in the path of said cam but that can be moved out of said path,
(e) an ear on said latch that normally is disposed out of said path of said cam but that can be moved into said path,
(f) said cam responding to a first revolution of said output shaft to engage said member on said latch and move said latch into latching position wherein said ear on said latch is in the path of said cam and wherein said latch is immediately adjacent said stator of said motor,
(g) a second cam that is mounted on and rotatable with said shaft,
(h) a lever that is movably mounted adjacent said second cam,
(i) a motor-energizing switch that is adjacent said lever, and
(j) an actuator that is movably mounted adjacent said latch and adjacent said lever,
(k) said lever having an abutment thereon,
(l) said actuator having a notch therein,
(m) said actuator having a spring thereon,
(n) said actuator normally being in a position where said notch thereof is spaced away from said abutment on said lever and said spring thereof is spaced away from the path of said latch,
(o) said second cam responding to said first revolution of said shaft to move said lever into switch-actuating position wherein said lever can enable said switch to supply current to said coil of said motor and then, close to the end of said first revolution of said shaft, can permit said lever to move out of said switch-actuating position so said coil of said motor can become de-energized,
(p) said latch responding to said de-energization of said coil of said motor to return to its initial position and thereby move said ear thereon out of the path of the first said cam,
(q) whereby during a first revolution of said shaft wherein said coil of said motor is energized and is thereafter de-energized said latch will be moved into latching position and will be held in latching position by said magnetic flux lines from said motor and will thereafter be freed for movement back to its initial position,
(r) said latch responding, as long as said actuator is in said position, to continued and uninterrupted energization of said coil of said motor to remain in latching position, and said ear on said latch thereafter intercepting and holding the first said cam before said shaft can complete a second revolution, (s) said actuator being movable into actuating position wherein said notch thereof coacts with said abutment on said lever to hold said lever in said switch-actuating position and wherein said spring will be in the path of said latch, (t) said switch being adapted to respond to the holding of said lever in switch-actuating position to keep said coil of said motor energized for a plurality of revolutions of said shaft, (u) the first said cam responding to the first of said plurality of revolutions of said shaft to engage said member on said latch and move said latch into latching position, and said spring on said actuator yielding to permit said latch to move into latching position but thereafter moving said latch back out of latching position as the first said cam moves beyond said member on said latch.

4. A cycle-controlling device that comprises:
(a) an electric motor that has an output shaft and a stator and a coil,
(b) a cam that is mounted on and rotatable with said shaft,
(c) a latch of magnetic material that is movable by said cam,
(d) an ear on said latch that normally is disposed out of said path of said cam but that can be moved into said path,
(e) said cam responding to a first revolution of said output shaft to move said latch into a position where said ear thereon will be in the path which said cam must follow during a second revolution,
(f) a second cam that is mounted on and rotatable with said shaft,
(g) a lever that is movably mounted adjacent said second cam,
(h) a motor-energizing switch that is adjacent said lever, and
(i) an actuator that is movably mounted adjacent said latch and adjacent said lever,
(j) said actuator and said lever having interacting surfaces that can hold said lever in switch-actuating position whenever said actuator is in its actuating position,
(k) said actuator having a spring thereon,
(l) said second cam responding to said first revolution of said shaft to move said lever into switch-actuating position wherein said lever can enable said switch to supply current to said coil of said motor and then, close to the end of said first revolution of said shaft, can permit said lever to move out of said switch-actuating position so said coil of said motor can become de-energized,
(m) said latch responding to said de-energization of said coil of said motor to return to its initial position and thereby move said ear thereon out of the path of the first said cam,
(n) whereby during a first revolution of said shaft wherein said coil of said motor is energized and is thereafter de-energized said latch will be moved into latching position and will be held in latching position by said magnetic flux lines from said motor and will thereafter be free for movement back to its initial position,
(o) said latch responding, when said actuator is not holding said lever in switch-actuating position, to continued and uninterrupted energization of said coil of said motor to remain in latching position so said ear on said latch can keep said cam from completing a second revolution,
(p) said spring of said actuator being in the path of said latch whenever said actuator is in actuating position and is holding said lever in switch-actuating position,
(q) said switch being adapted to respond to the holding of said lever in switch-actuating position to keep said coil of said motor energized for a plurality of revolutions of said shaft,
(r) the first said cam responding to the first of said plurality of revolutions of said shaft to move said latch into latching position, and said spring on said actuator yielding to permit said latch to move into latching position but thereafter moving said latch back out of latching position as the first said cam moves beyond said latch.

5. A cycle-controlling device that comprises:
(a) an electric motor that has an output shaft and a stator and a coil,
(b) a cam that is mounted on and rotatable with said shaft,
(c) a latch that is movable by said cam,
(d) said cam responding to a first revolution of said output shaft to move said latch into a position where said latch will be in the path which said cam must follow during a second revolution,
(e) a second cam that is mounted on and rotatable with said shaft,
(f) a lever that is movably mounted adjacent said second cam,
(g) a motor-energizing switch that is adjacent said lever, and
(h) an actuator that is movably mounted adjacent said latch and adjacent said lever,
(i) said actuator and said lever having interacting surfaces that can hold said lever in switch-actuating position whenever said actuator is in its actuating position,
(j) said second cam responding to said first revolution of said shaft to move said lever into switch-actuating position wherein said lever can enable said switch to supply current to said coil of said motor and then, close to the end of said first revolution of said shaft, can permit said lever to move out of said switch-actuating position so said coil of said motor can become de-energized,
(k) said latch responding to said de-energization of said coil of said motor to return to its initial position and thereby move out of the path of the first said cam,
(l) whereby during a first revolution of said shaft wherein said coil of said motor is energized and is thereafter de-energized said latch will be moved into latching position and will be held in latching position and will thereafter be freed for movement back to its initial position.
(m) said latch responding, when said actuator is not holding said lever in switch-actuating position, to continued and uninterrupted energization of said coil of said motor to remain in latching position and thereby keep said cam from completing a second revolution,
(n) said switch being adapted to respond to the holding of said lever in switch-actuating position to keep said coil of said motor energized for a plurality of revolutions of said shaft,
(o) the first said cam responding to the first of said plurality of revolutions of said shaft to move said latch into latching position, and said actuator permitting said latch to move into latching position but thereafter moving said latch back out of latching position as the first said cam moves beyond said latch.

6. A cycle-controlling device that comprises:
(a) an electric motor that has an output shaft and a stator and a coil,
(b) a cam that is mounted on and rotatable with said shaft, (c) a latch of magnetic material that is movably mounted adjacent said cam and that is normally spaced away from said stator,
(d) a member on said latch that normally lies in the path of said cam but that can be moved out of said path,
(e) an ear on said latch that normally is disposed out of said path of said cam but that can be moved into said path,
(f) said cam responding to a first revolution of said output shaft to engage said member on said latch and move said latch into latching position wherein said ear on said latch is in the path of said cam and wherein said latch is immediately adjacent said stator of said motor,
(g) an actuator,
(h) said actuator having a spring thereon,
(i) said actuator normally being in a position where said spring thereof is spaced away from the path of said latch,
(j) said coil of said motor tending, after said cam has moved said latch immediately adjacent said stator of said motor, to hold said latch in latching position as long as said coil is energized but permitting said latch to return to its initial position when said coil becomes de-energized,
(k) during a first revolution of said shaft wherein said coil of said motor is energized and is thereafter de-energized said latch will be moved into latching position and will be held in latching position and will thereafter be freed for movement back to its initial position,
(l) said latch responding, as long as said actuator is in said position, to continued and uninterrupted energization of said coil of said motor to remain in latching position and thereby intercept and hold said cam before said shaft can complete a second revolution,
(m) said actuator being movable into actuating position wherein said spring will be in the path of said latch,
(n) said cam responding to each revolution of said output shaft to move said latch into latching position, and said spring on said actuator yielding to permit said latch to move into latching position but thereafter moving said latch back out of latching position as said cam moves beyond said latch.

7. A cycle-controlling device that comprises:
(a) an electric motor that has an output shaft and a stator and a coil,
(b) a cam that is mounted on and rotatable with said shaft,
(c) a latch that is movable by said cam,
(d) said cam responding to a first revolution of said output shaft to move said latch into a position where said latch will be in the path which said cam must follow during a second revolution, and
(e) an actuator,
(f) said actuator normally being in a position where it is out of the path of said latch,
(g) said coil of said motor tending, after said cam has moved said latch into said path, to hold said latch in said path as long as said coil is energized but permitting said latch to return to its initial position when said coil becomes de-energized,
(h) whereby during a first revolution of said shaft wherein said coil of said motor is energized and is thereafter de-energized said latch will be moved into latching position and will be held in latching position and will thereafter be freed for movement back to its initial position,
(i) said latch responding, as long as said actuator is in said position, to continued and uninterrupted energization of said coil of said motor to remain in latching position and thereby block said cam before said shaft can complete a second revolution,
(j) said actuator being movable into actuating position wherein it is in the path of said latch,
(k) said cam responding to each revolution of said output shaft to move said latch into latching position, and said actuator permitting said latch to move into latching position but thereafter moving said latch back out of latching position as said cam frees said latch.

8. A change-making device that comprises:
(a) an electric motor that has an output shaft,
(b) said electric motor normally being de-energized and usually being energized just long enough to enable it to rotate said output shaft through one revolution,
(c) said electric motor being selectively energizable to rotate said output shaft continuously through a succession of revolutions,
(d) a latch that is adapted to be moved into position to block rotation of said output shaft if said output shaft tends to continue to rotate after said output shaft has completed one revolution,
(e) means that acts, during each revolution of said output shaft, to urge said latch into position to block rotation of said output shaft and that acts, before said output shaft starts a further revolution, to free said latch,
(f) said latch being magnetic in nature and tending to remain in blocking position as long as said motor is energized,
(g) a coin-ejecting slide that is adjacent said motor and that is adapted to be moved by said motor, and
(h) a disabling element that is adapted to be moved into position where it can keep said latch from remaining in said position to block further rotation of said output shaft of said motor,
(i) said disabling element having a resilient portion that is in the path of said latch, whenever said disabling element is moved into said position,
(j) said resilient portion of said disabling element yielding to permit said means to urge said latch into blocking position during each revolution of said output shaft but thereafter forcing said latch out of blocking position before said output shaft starts said further revolution,
(k) whereby said disabling element can make it possible for said motor to rotate the output shaft thereof through a succession of revolutions without having said output shaft intercepted and held by said latch.

9. A cycle-controlling device that comprises:
(a) an electric motor that has an output shaft,
(b) said electric motor normally being de-energized and usually being energized just long enough to enable it to rotate said output shaft through one revolution,
(c) said electric motor being selectively energizable to rotate said output shaft continuously through a succession of revolutions,
(d) a latch that is adapted to be moved into position to block rotation of said output shaft if said output shaft tends to continue to rotate after said output shaft has completed one revolution,
(e) means that acts, during each revolution of said output shaft, to urge said latch into position to block rotation of said output shaft and that acts, before said output shaft starts a further revolution, to free said latch,
(f) said latch being magnetic in nature and tending to remain in blocking position as long as said motor is energized, and
(g) a disabling element that is adapted to be moved into position where it can keep said latch from remaining in said position to block further rotation of said output shaft of said motor, (h) said disabling element moving into the path of said latch whenever said disabling element is moved into said position,
(i) said disabling element being yieldable in part to permit said means to urge said latch into blocking position during each revolution of said output shaft but thereafter forcing said latch out of blocking position before said output shaft starts said further revolution,
(j) the forcing of said latch out of blocking position by said disabling element enabling said motor to rotate the said output shaft thereof through said further revolution.

10. A cycle-controlling device that comprises:
(a) an electric motor that has an output shaft,
(b) said electric motor normally being de-energized and usually being energized just long enough to enable it to rotate said output shaft through one revolution,
(c) said electric motor being selectively energizable to rotate said output shaft continuously through a succession of revolutions,
(d) a latch that is adapted to be moved into position to block rotation of said output shaft if said output shaft tends to continue to rotate after said output shaft has completed one revolution,
(e) means that acts, during each revolution of said output shaft, to urge said latch into position to block rotation of said output shaft and that acts, before said output shaft starts a further revolution, to free said latch,
(f) said latch being magnetic in nature and tending to remain in blocking position as long as said motor is energized, and
(g) a disabling element that is adapted to be moved into position where it can keep said latch from remaining in said position to block further rotation of said output shaft of said motor,
(h) said disabling element moving into the path of said latch whenever said disabling element is moved into said position,
(i) said disabling element having a spring that normally is displaced from the path of said latch but that is in the path of said latch whenever said disabling element is in its moved position,
(j) said spring yielding to permit said means to urge said latch into latching position during each revolution of said output shaft but thereafter moving said latch back out of latching position before said latch can block a second revolution of said output shaft,
(k) whereby said latch can remain in latching position and prevent a further revolution of said output shaft wherever said disabling element is out of said position but said latch can not remain in latching position whenever said disabling element is in said latching position.

11. A cycle-controlling device that comprises:
(a) an electric motor that has an output shaft,
(b) said electric motor normally being de-energized and usually being energized just long enough to enable it to rotate said output shaft through one revolution,
(c) said electric motor being selectively energizable to rotate said output shaft continuously through a succession of revolutions,
(d) a latch that is adapted to be moved into position to block rotation of said output shaft if said output shaft tends to continue to rotate after said output shaft has completed one revolution,
(e) means that responds to said output shaft, during each revolution of said output shaft, to positively force said latch into blocking position and that acts, before said output shaft starts a further revolution, to free said latch,
(f) a disabling element that is adapted to be moved into position where it can keep said latch from remaining in said position to block further rotation of said output shaft of said motor,
(g) said disabling element having a resilient portion that is in the path of said latch, whenever said disabling element is moved into said position,
(h) said output shaft and said means positively forcing said latch into latching position during each revolution of said output shaft and said disabling element yielding to permit said output shaft and said means to force said latch into blocking position but thereafter resiliently urging said latch out of latching position before said output shaft starts said further revolution.

12. A cycle-controlling device that comprises:
(a) an electric motor that has an output shaft,
(b) said electric motor normally being de-energized and usually being energized just long enough to enable it to rotate said output shaft through one revolution,
(c) said electric motor being selectively energizable to rotate said output shaft continuously through a succession of revolutions,
(d) a latch that is adapted to be moved into position to block rotation of said output shaft if said output shaft tends to continue to rotate after said output shaft has completed one revolution,
(e) means that acts, during each revolution of said output shaft, to urge said latch into position to block rotation of said output shaft and that acts, before said output shaft starts a further revolution, to free said latch,
(f) a switch that can keep said motor energized continuously, and
(g) a disabling element that is adapted to be moved into position where it can keep said latch from remaining in said position to block further rotation of said output shaft of said motor and can cause said switch to keep said motor energized continuously,
(h) said disabling element permitting said means to urge said latch into blocking position during each revolution of said output shaft but causing said latch to move out of said blocking position before said output shaft starts said further revolution.

References Cited by the Examiner

UNITED STATES PATENTS

| 2,694,781 | 11/1954 | Hinz | 310—77 |
| 2,739,603 | 3/1956 | Fry | 133—5 |
| 2,782,791 | 2/1957 | Sigo | 133—5 |
| 2,879,416 | 3/1959 | Blanz | 310—77 |
| 2,881,892 | 4/1959 | Ylinen | 133—5 X |
| 3,176,696 | 4/1965 | Stevens | 133—5 X |

LOUIS J. DEMBO, *Primary Examiner.*

EVERETT W. KIRBY, STANLEY H. TOLLBERG,
*Examiners.*